(12) United States Patent
Kim et al.

(10) Patent No.: US 12,035,163 B2
(45) Date of Patent: Jul. 9, 2024

(54) METHOD AND APPARATUS FOR MEASUREMENT LOGGING AND REPORTING IN WIRELESS COMMUNICATION SYSTEM

(71) Applicant: LG ELECTRONICS INC., Seoul (KR)

(72) Inventors: Hongsuk Kim, Seoul (KR); Sunghoon Jung, Seoul (KR); Taehun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 371 days.

(21) Appl. No.: 17/310,744

(22) PCT Filed: Feb. 24, 2020

(86) PCT No.: PCT/KR2020/002608
§ 371 (c)(1),
(2) Date: Aug. 20, 2021

(87) PCT Pub. No.: WO2020/175868
PCT Pub. Date: Sep. 3, 2020

(65) Prior Publication Data
US 2022/0022078 A1   Jan. 20, 2022

(30) Foreign Application Priority Data
Feb. 26, 2019   (KR) .................. 10-2019-0022380

(51) Int. Cl.
*H04W 24/10*   (2009.01)
*H04W 76/27*   (2018.01)
(52) U.S. Cl.
CPC .......... *H04W 24/10* (2013.01); *H04W 76/27* (2018.02)

(58) Field of Classification Search
CPC .............................. H04W 24/10; H04W 76/27
USPC ........................................................ 370/252
See application file for complete search history.

(56) References Cited

U.S. PATENT DOCUMENTS

2013/0196604 A1*   8/2013   Jung ..................... H04W 24/02
                                                        455/67.11
2018/0220486 A1   8/2018   Tseng et al.

FOREIGN PATENT DOCUMENTS

KR   20150091267   8/2015

OTHER PUBLICATIONS

R2-1901957 (Year: 2019).*
R2-1901712 (Year: 2019).*
R2-1900622 (Year: 2019).*
R2-1900932 (Year: 2019).*
PCT International Application No. PCT/KR2020/002608, International Search Report dated Jun. 8, 2020, 2 pages.
(Continued)

*Primary Examiner* — Intekhaab A Siddiquee
(74) *Attorney, Agent, or Firm* — LEE, HONG, DEGERMAN, KANG & WAIMEY

(57) ABSTRACT

The present disclosure relates to measurement logging and reporting in wireless communications. According to an embodiment of the present disclosure, a method performed by a wireless device in a wireless communication system comprises: transiting from an inactive state to an idle state based on a transition cause; logging the transition cause; and transmitting a logged measurement report comprising the logged transition cause to a network.

9 Claims, 16 Drawing Sheets

(56) References Cited

OTHER PUBLICATIONS

CMCC, "New Measurements for NR MDT," R2-1901957, 3GPP TSG-RAN WG2 Meeting #105, Mar. 2019, 6 pages.
Ericsson, "Unification of EN-DC terminology," R2-1901712, 3GPP TSG-RAN WG2 Meeting #105, Mar. 2018, 482 pages.

* cited by examiner

METHOD AND APPARATUS FOR MEASUREMENT LOGGING AND REPORTING IN WIRELESS COMMUNICATION SYSTEM

CROSS-REFERENCE TO RELATED APPLICATIONS

This application is the National Stage filing under 35 U.S.C. 371 of International Application No. PCT/KR2020/002608, filed on Feb. 24, 2020, which claims the benefit of earlier filing date and right of priority to Korean Application No. 10-2019-0022380, filed on Feb. 26, 2019, the contents of which is hereby incorporated by reference herein in its entirety.

BACKGROUND OF THE DISCLOSURE

Field of the Disclosure

The present disclosure relates to measurement logging and reporting in wireless communications.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Minimization of driving tests (MDT) refers to a test by operators for a coverage optimization by using a UE. For example, in the MDT, measurements of a coverage for the test may be performed by the operator using the UE instead of a vehicle. Thus, cost and resources that might have been used for a driving test may be reduced according to the MDT scheme THE MDT may comprise a logged MDT. According to the logged MDT, the UE may perform measurements to obtain a logged measurement at a particular time interval. The UE may transmit a logged measurement report comprising the logged measurements to a network, and the network/operator may use the logged measurements for the coverage optimization.

SUMMARY OF THE DISCLOSURE

Technical Problem

An aspect of the present disclosure is to provide method and apparatus for measurement logging and reporting in a wireless communication system.

Another aspect of the present disclosure is to provide method and apparatus for logging measurements when an RRC state transition occurs in a wireless communication system.

Another aspect of the present disclosure is to provide method and apparatus for reporting information regarding the RRC state transition in a wireless communication system.

Technical Solution

According to an embodiment of the present disclosure, a method performed by a wireless device in a wireless communication system comprises: transiting from an inactive state to an idle state based on a transition cause; logging the transition cause; and transmitting a logged measurement report comprising the logged transition cause to a network.

According to an embodiment of the present disclosure, a wireless device in a wireless communication system comprises: a transceiver; a memory; and at least one processor operatively coupled to the transceiver and the memory, and configured to: transit from an inactive state to an idle state based on a transition cause, log the transition cause, and control the transceiver to transmit a logged measurement report comprising the logged transition cause to a network.

According to an embodiment of the present disclosure, a processor for a wireless device in a wireless communication system is configured to control the wireless device to perform operations comprising: transiting from an inactive state to an idle state based on a transition cause; logging the transition cause; and transmitting a logged measurement report comprising the logged transition cause to a network.

According to an embodiment of the present disclosure, a computer-readable medium having recorded thereon a program for performing each step of a method on a computer is provided. The method comprises: transiting from an inactive state to an idle state based on a transition cause; logging the transition cause; and transmitting a logged measurement report comprising the logged transition cause to a network.

Advantageous Effect

The present disclosure can have various advantageous effects.

For example, a wireless device may log a transition cause of a transmission from an inactive state to an idle state and transmit a logged measurement report including the logged transition cause to a network so that the network may know why the wireless device transits from the inactive state to the idles state and why the wireless device performs RRC_IDLE procedures, and therefore, the network can optimize the network performance based on the logged measurement report.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to

DESCRIPTION OF EXEMPLARY EMBODIMENTS

Figure 1:
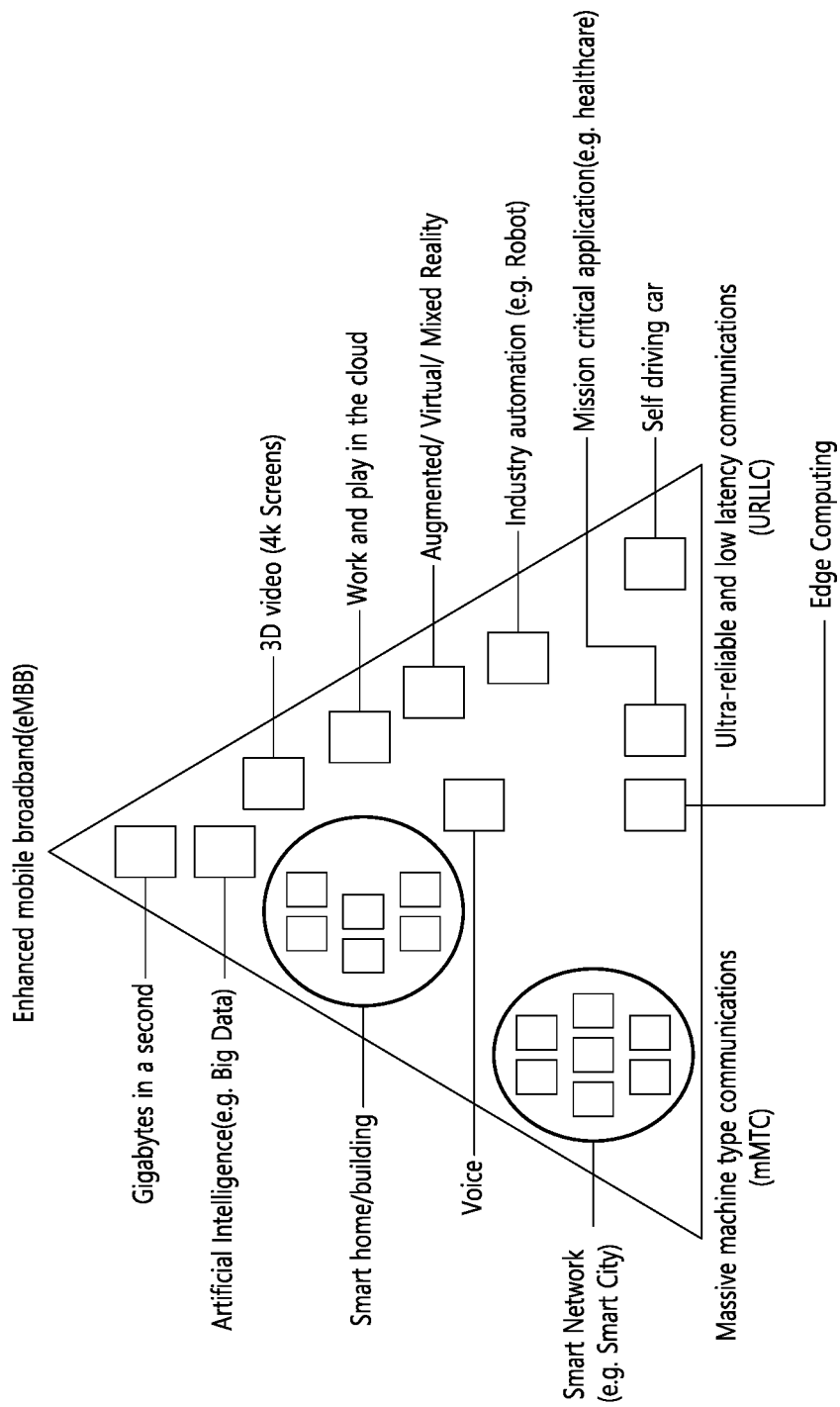
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

The terms used throughout the disclosure can be defined as the followings:

Any cell selection state: In the any cell selection state, a UE shall perform cell selection process to find a suitable cell. If the cell selection process fails to find a suitable cell after a complete scan of all RATs and all frequency bands supported by the UE, the UE shall attempt to find an acceptable cell of any PLMN to camp on, trying all RATs that are supported by the UE and searching first for a high-quality cell. The UE, which is not camped on any cell, shall stay in the any cell selection state. The any cell selection state may be applicable for RRC_IDLE and RRC_INACTIVE state.

Camped on any cell state: The camped on any cell state may be applicable for RRC_IDLE state. In the camped on any cell state, the UE may be in idle mode and has completed the cell selection/reselection process, and has chosen a cell irrespective of PLMN identity.

In the camped on any cell state, the UE shall perform the following tasks:
- monitor short Messages transmitted with P-RNTI over DCI;
- monitor relevant system information;
- perform necessary measurements for the cell reselection evaluation procedure;
- execute the cell reselection evaluation process;
- regularly attempt to find a suitable cell trying all frequencies of all RATs that are supported by the UE. If a suitable cell is found, UE shall move to camped normally state.

if the UE supports voice services and the current cell does not support IMS emergency calls as indicated by the field ims-EmergencySupport in SIB1, the UE shall perform cell selection/reselection to an acceptable cell that supports emergency calls in any supported RAT regardless of priorities provided in system information from current cell, if no suitable cell is found.

"Acceptable cell" refers to a cell on which the UE may camp to obtain limited service (originate emergency calls and receive ETWS and CMAS notifications). Such a cell shall fulfil the requirements that i) the cell is not barred, and ii) the cell selection criteria are fulfilled. The requirements may be the minimum set of requirements to initiate an emergency call and to receive ETWS and CMAS notification in a network.

"Suitable cell" refers to a cell on which a UE may camp. For example, a cell may be considered as suitable if the following conditions are fulfilled:
  The cell is part of either the selected PLMN or the registered PLMN or PLMN of the equivalent PLMN list;
  The cell selection criteria are fulfilled;
  The cell is not barred according to the latest information provided by NAS;
  The cell is part of at least one TA that is not part of the list of "Forbidden Tracking Areas", which belongs to either the selected PLMN or the registered PLMN or PLMN of the equivalent PLMN list.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4 K or more (6 K, 8 K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
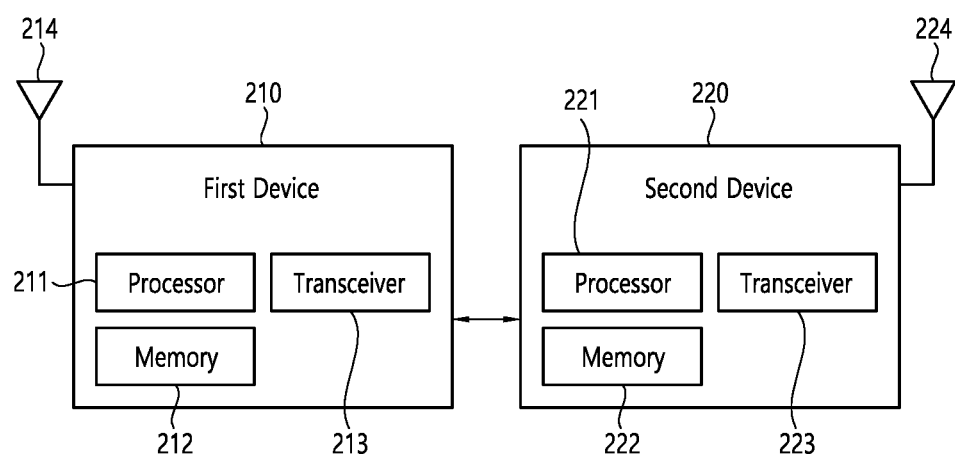
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the first device described throughout the disclosure. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled by the processor 211 to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the second device 220 described throughout the disclosure. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled by the processor 221 to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
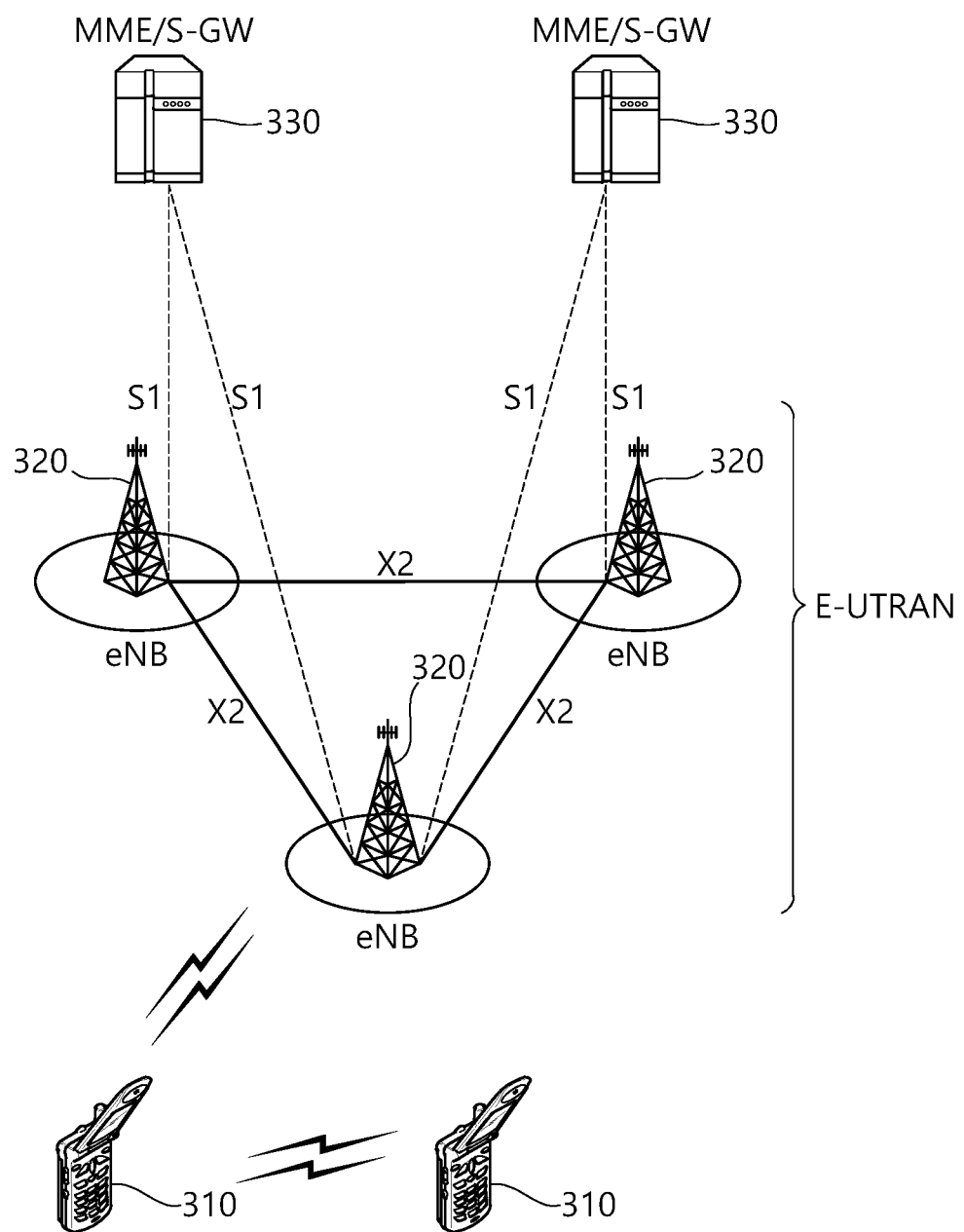
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMES/S-GWs and eNBs.

Figure 4:
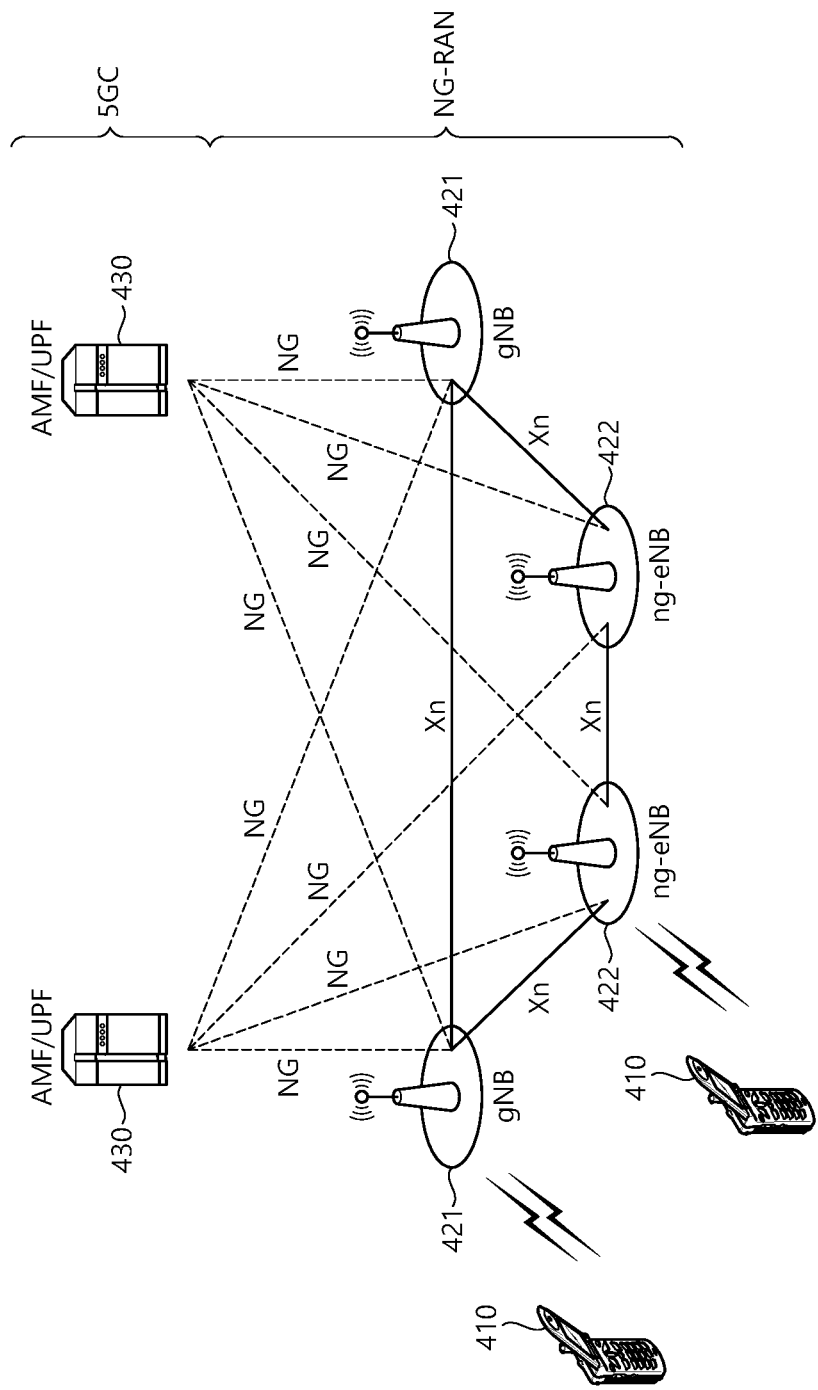
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
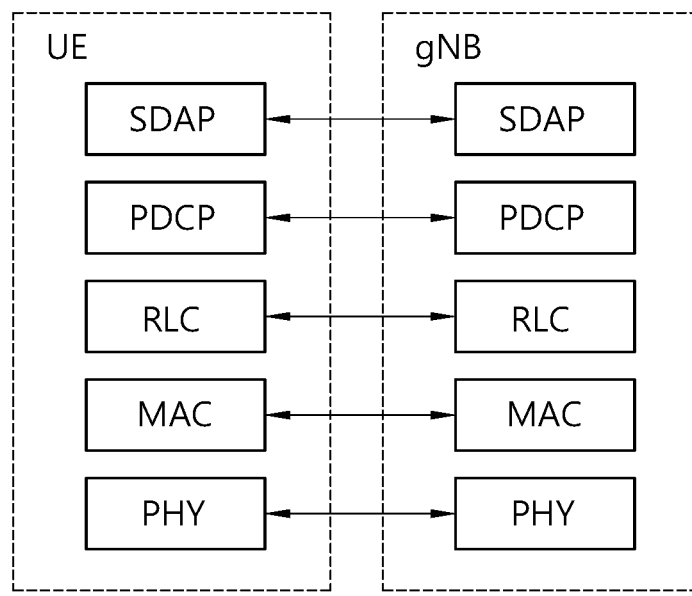
FIG. 5 shows a block diagram of a user plane protocol stack to which the technical features of the present disclosure can be applied.
Figure 6:
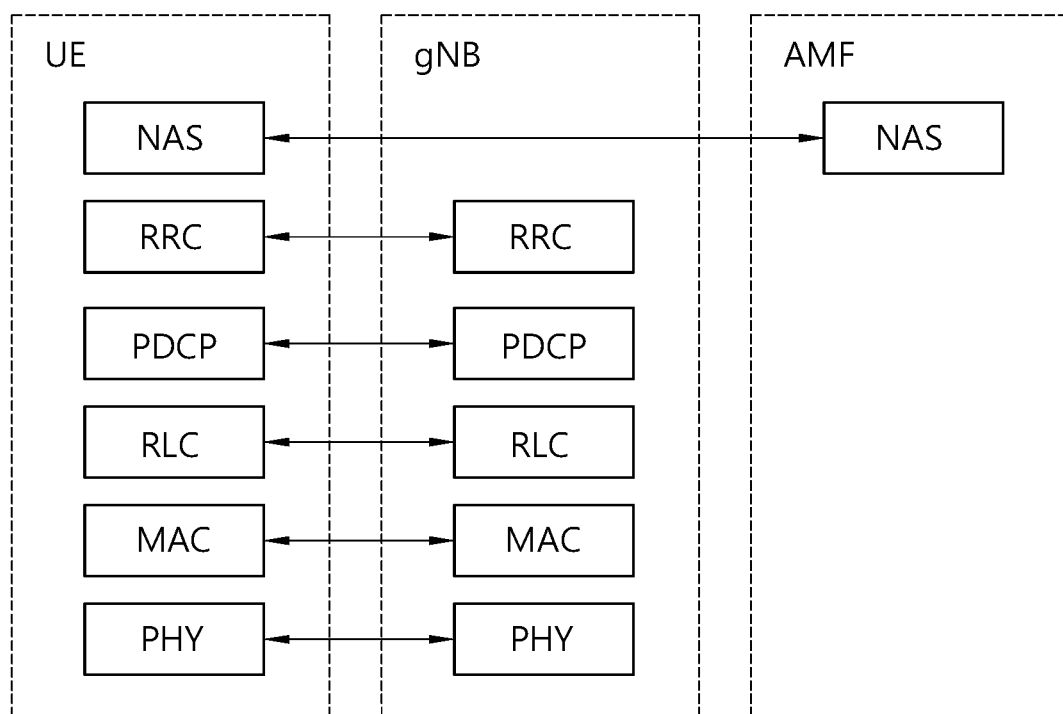
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARM), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC_layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
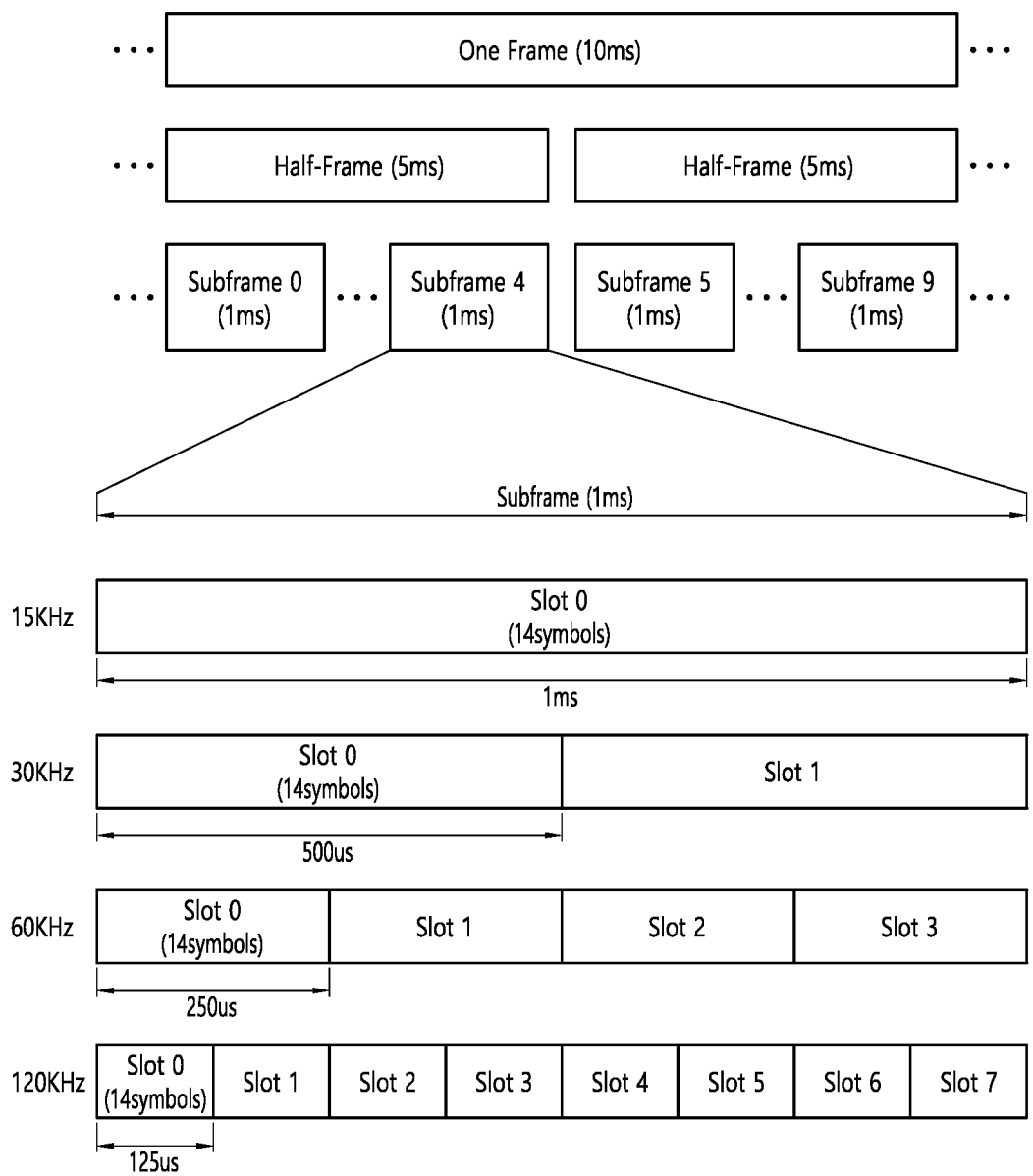
FIG. 7 illustrates a frame structure in a 3GPP based wireless communication system.

FIG. 7 illustrates a frame structure in a 3GPP based wireless communication system.

The frame structure illustrated in FIG. 7 is purely exemplary and the number of subframes, the number of slots, and/or the number of symbols in a frame may be variously changed. In the 3GPP based wireless communication system, an OFDM numerology (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 7, downlink and uplink transmissions are organized into frames. Each frame has Tf=10 ms duration. Each frame is divided into two half-frames, where each of the half-frames has 5 ms duration. Each half-frame consists of 5 subframes, where the duration Tsf per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2u*15$ kHz. The following table shows the number of OFDM symbols per slot, the number of slots per frame, and the number of slots per for the normal CP, according to the subcarrier spacing of $\Delta f=2u*15$ kHz.

TABLE 3

| U | Nslotsymb | Nframe, uslot | Nsubframe, uslot |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing $\Delta f=2u*15$ kHz.

TABLE 4

| u | Nslotsymb | Nframe, uslot | Nsubframe, uslot |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of Nsize,ugrid,x*NRBsc subcarriers and Nsubframe,usymb OFDM symbols is defined, starting at common resource block (CRB) Nstart,ugrid indicated by higher-layer signaling (e.g. radio resource control (RRC) signaling), where Nsize,ugrid,x is the number of resource blocks (RBs) in the resource grid and the subscript x is DL for downlink and UL for uplink. NRBsc is the number of subcarriers per RB. In the 3GPP based wireless communication system, NRBsc is 12 generally. There is one resource grid for a given antenna port p, subcarrier spacing configuration u, and transmission direction (DL or UL). The carrier bandwidth Nsize,ugrid for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE.

Each RE in the resource grid is uniquely identified by an index k in the frequency domain and an index 1 representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to NsizeBWP,i−1, where i is the number of the bandwidth part. The relation between the physical resource block nPRB in the bandwidth part i and the common resource block nCRB is as follows: nPR=nCRB+NsizeBWP,i, where NsizeBWP,i is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with dual connectivity (DC). For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells. In DC, two MAC entities are configured in a UE: one for the MCG and one for the SCG.

Figure 8:
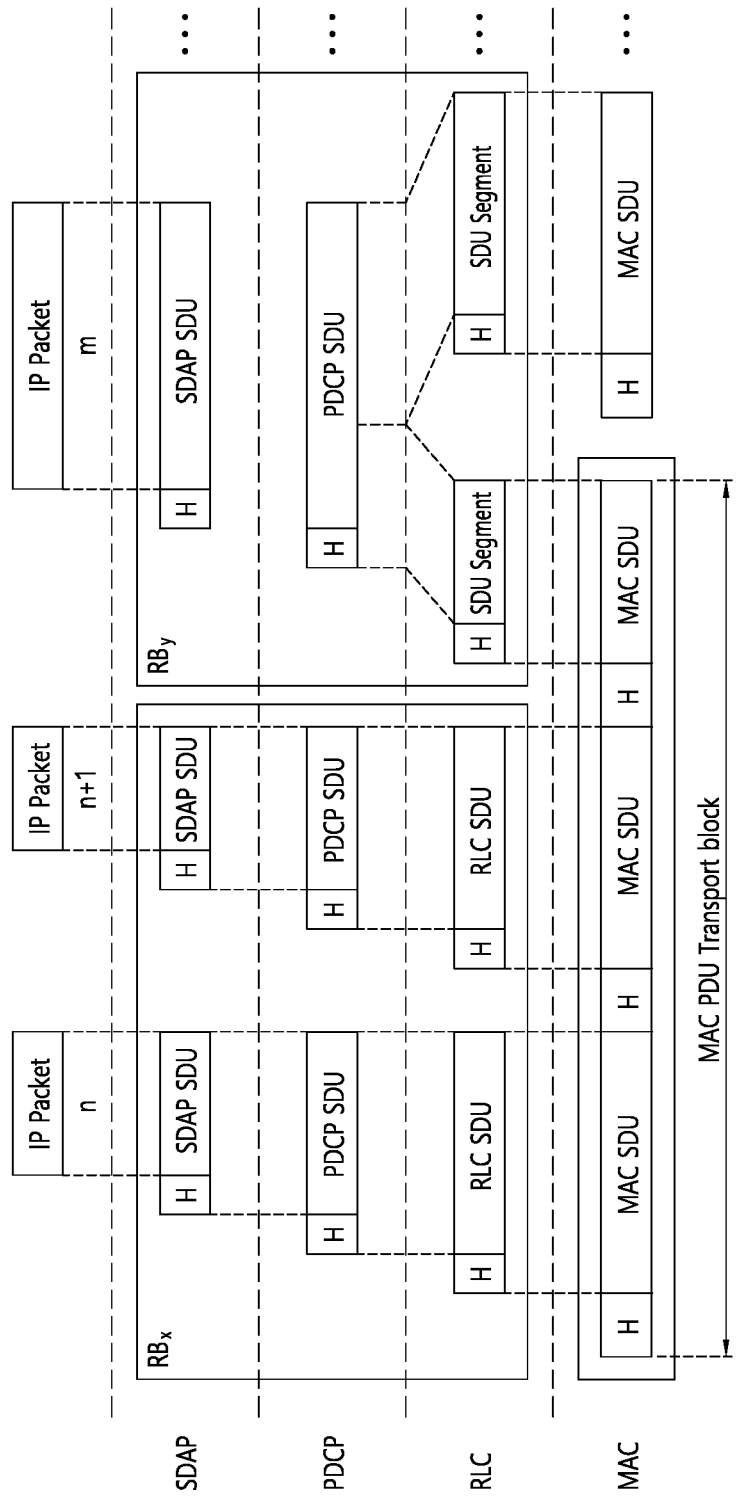
FIG. 8 illustrates a data flow example in the 3GPP NR system.

FIG. 8 illustrates a data flow example in the 3GPP NR system.

In FIG. 8, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Data unit(s) (e.g. PDCP SDU, PDCP PDU, RLC SDU, RLC PDU, RLC SDU, MAC SDU, MAC CE, MAC PDU) in the present disclosure is(are) transmitted/received on a physical channel (e.g. PDSCH, PUSCH) based on resource allocation (e.g. UL grant, DL assignment). In the present disclosure, uplink resource allocation is also referred to as uplink grant, and downlink resource allocation is also referred to as downlink assignment. The resource allocation includes time domain resource allocation and frequency domain resource allocation. In the present disclosure, an uplink grant is either received by the UE dynamically on PDCCH, in a Random Access Response, or configured to the UE semi-persistently by RRC. In the present disclosure, downlink assignment is either received by the UE dynamically on the PDCCH, or configured to the UE semi-persistently by RRC signalling from the BS.

Figure 9:
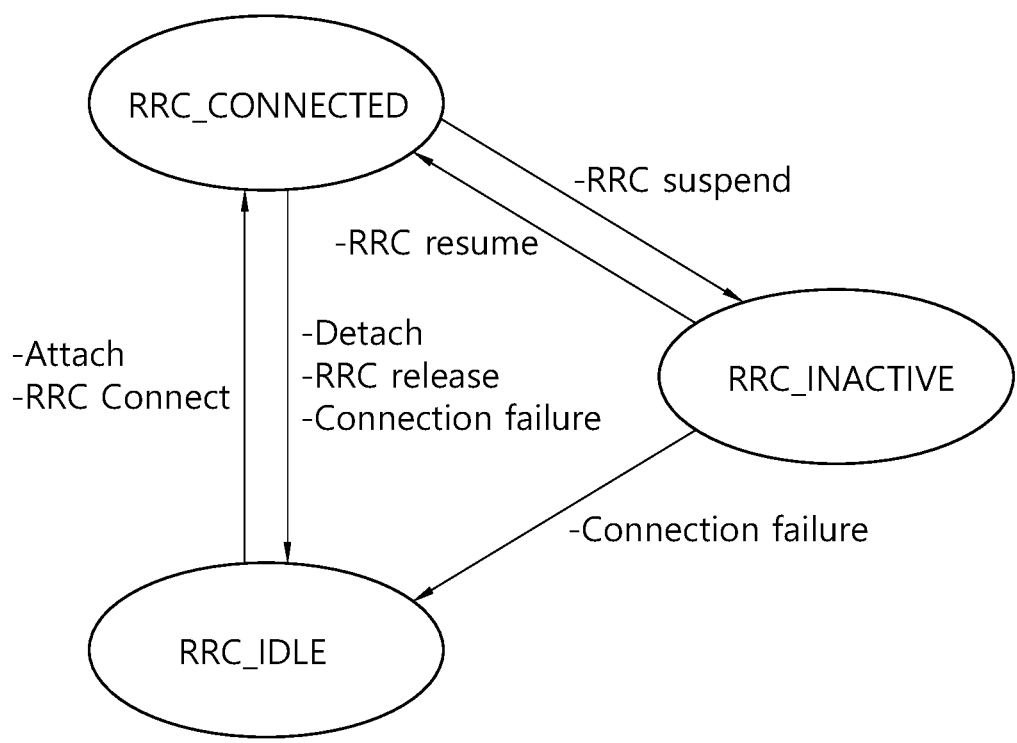
FIG. 9 shows an example of possible RRC states in a wireless communication system to which technical features of the present disclosure can be applied.

FIG. 9 shows an example of possible RRC states in a wireless communication system to which technical features of the present disclosure can be applied.

Referring to FIG. 9, there may be 3 possible RRC states in a wireless communication system (i.e., RRC_IDLE, RRC_CONNECTED and/or RRC_IDLE).

In RRC_IDLE (or, idle mode/state), RRC context for communication between a UE and a network may not be established in RAN, and the UE may not belong to a specific cell. Also, in RRC_IDLE, there is no core network connection for the UE. Since the device remains in sleep mode in most of the time to reduce battery consumption, data transfer between the UE and the network may not occur. UEs in RRC_IDLE may periodically wake-up to receive paging messages from the network. Mobility may be handled by the UE through cell reselection. Since uplink synchronization is not maintained, the UE may not perform uplink transmission other than transmissions for random access (e.g., random access preamble transmission) to move to RRC_CONNECTED.

In RRC_CONNECTED (or, connected state/mode), RRC context for communication between a UE and a network may be established in RAN. Also, in RRC_CONNECTED, core network connection is established for the UE. Since the UE belongs to a specific cell, cell-radio network temporary identifier (C-RNTI) for signallings between the UE and the network may be configured for the UE. Data transfer between the UE and the network may occur. Mobility may be handled by the network—that is, the UE may provide measurement report to the network, and the network may transmit mobility commands to the UE to perform a mobility. Uplink time alignment may need to be established based on a random access and maintained for data transmission.

In RRC_INACTIVE (or, inactive state/mode), RRC context for communication between a UE and a network may be kept in RAN. Data transfer between the UE and the network may not occur. Since core network connection may also be kept for the UE, the UE may fast transit to a connected state for data transfer. In the transition, core network signalling may not be needed. The RRC context may be already established in the network and idle-to-active transitions can be handled in the RAN. The UE may be allowed to sleep in a similar way as in RRC_IDLE, and mobility may be handled through cell reselection without involvement of the network. The RRC_INACTIVE may be construed as a mix of the idle state and the connected state.

As illustrated in FIG. 9, the UE may transit to RRC_CONNECTED from RRC_IDLE by performing initial attach procedure or RRC connection establishment procedure. The UE may transit to RRC_IDLE from RRC_CONNECTED when detach, RRC connection release and/or connection failure (e.g., radio link failure (RLF)) has occurred. The UE may transit to RRC_INACTIVE from RRC_INACTIVE when RRC connection is suspended, and transit to RRC_CONNECTED from RRC_INACTIVE when RRC connection is resume. The UE may transit to RRC_IDLE from RRC_INACTIVE when connection failure such as RLF has occurred.

According to various embodiments, the UE may transit to RRC_IDLE from RRC_INACTIVE after camping on the acceptable cell.

Hereinafter, the minimization of driving tests (MDT) is described.

The MDT is to test by operators for coverage optimization by using a UE instead of a vehicle. The coverage may be varied according to a location of a base station, an arrangement of a neighbor building, and a use case scenario of a user. Therefore, the operator may need to periodically perform a driving test, which consumes a lot of cost and resources. The MDT may refer to a scheme of measuring the coverage by the operator using the UE.

The MDT may comprise a logged MDT and an immediate MDT. According to the logged MDT, the UE may perform the MDT measurement to obtain a logged measurement and transmit the logged measurement to a network at a particular time point. According to the immediate MDT, the UE may perform the MDT measurement and transmit the result of the measurement to the network when a reporting condition is satisfied. In the logged MDT scheme, the MDT measurement may be performed in the RRC idle mode, whereas in the immediate MDT scheme, the MDT measurement may be performed in the RRC connection mode.

Figure 10:
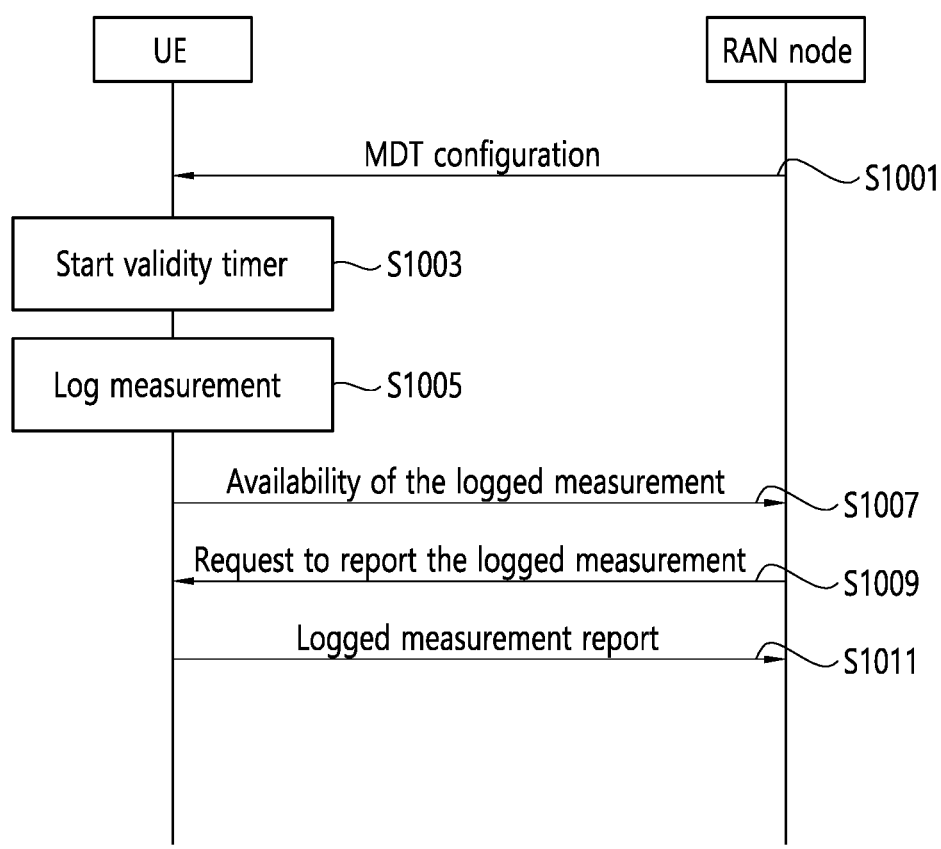
FIG. 10 shows an example of a process for performing an MDT to which technical features of the present disclosure can be applied.

FIG. 10 shows an example of a process for performing an MDT to which technical features of the present disclosure can be applied.

Referring to FIG. 10, in step S1001, a UE may receive a MDT configuration from a network. Throughout the disclosure, the MDT configuration may also be referred to as "logged measurement configuration". The UE may be in the RRC connected mode. Even when the UE transits to the RRC idle mode from the RRC connected mode, the MDT configuration may be maintained, and accordingly, the MDT measurement result may also be maintained.

The MDT configuration may include at least one of a logging interval, a reference time or an area configuration. The logging interval may indicate a period for storing the measurement result. The reference time may be used to indicate a reference time used when the UE transmits the logged measurement. The area configuration may indicates an area in which the UE is requested to perform the logging.

Upon receiving the MDT configuration, in step S1003, the UE may start a validity timer. The validity timer may indicate a lifetime of the MDT configuration. That is, the validity timer may indicate a time period during which the MDT configuration is valid. A value of the validity timer may be included in the MDT configuration. Such value may be called a logging duration. When the UE receives the MDT configuration, the UE may set the value of the validity timer as the logging duration and start the validity timer.

In step S1005, the UE may transit to the RRC idle mode and then log the measurement based on the MDT configuration while the validity timer is running. For example, the MDT measurement may be performed on a basis of the logging interval in the MDT configuration. The MDT measurement value may comprise at least one of reference signal received power (RSRP), reference signal received quality (RSRQ), received signal code power (RSCP), or Ec/No.

In step S1007, if there are the logged MDT measurements, the UE may send an availability of the logged measurement to a RAN node when the UE transits from the RRC idle mode to the RRC connection mode. The UE may send the availability of the logged measurement to the network when the RRC connection is established, re-established, or re-configured.

In step S1009, the RAN node which receives that the logged MDT measurement exists from the UE may request the UE to transmit the logged MDT measurement. The network which learns about the logged measurement may transmit an information request (e.g., UE information request) for requesting the reporting of the logged measurement to the UE.

In step S1011, after/upon receiving the request to report the logged measurement, the UE may transmit a logged measurement report comprising the logged measurements to the RAN node. For example, the UE may transmit an information response (e.g., UE information response) including the logged measurement to the RAN node. The logged measurement report may comprise contents measured by the UE while the MDT measurement is performed. The contents may primarily be related to a wireless environment. The MDT measurement may include a cell identifier, a signal quality of a cell and/or a signal strength. The MDT measurement may include a measurement time and/or a measurement location.

According to various embodiments, when the validity timer expires, the UE may discard the MDT configuration and start a conservation timer. The UE may discard the MDT configuration and stop the MDT measurement. However, the logged measurement may still be valid and maintained. The conservation timer may indicate a lifetime of the logged measurement. That is, the conservation timer is related to a time period during which the logged measurement is valid.

When the conservation timer expires, the logged measurement may be discarded. When a reporting request of the logged measurement is received from the RAN node during when the conservation timer is running, the UE may report the logged measurement.

A value of the conservation timer may be fixed. For example, the value of the conservation timer may be 48 hours. Alternatively, the value of the conservation timer may be included in the MDT configuration such that the RAN node may notify the value of the conservation timer to the UE.

When a new MDT configuration is received, the current MDT configuration may be updated to a new MDT configuration and the validity timer may be restarted. Also, the MDT measurement previously logged according to the previous MDT configuration may be discarded.

In a wireless communication system such as NR, since RRC connection is suspended for UEs in RRC_INACTIVE and UE behavior in RRC_INACTIVE may be similar to that in RRC_IDLE, it is straightforward to support logged MDT for UEs in RRC_INACTIVE. Even though the MDT measurement configuration and reporting procedures may be applied to UEs in RRC_INACTIVE, there still be some other RRC_INACTIVE UE specific measurements that should be logged to fully support network operators with network performance optimization. However, the UE in RRC_INACTIVE may encounter several events that may lead to the change of RRC state. Logging of such RRC state change from RRC_INACTIVE or logging of the event in RRC_INACTIVE may be beneficial for a network to optimize the network performance based on the received logged measurement report.

Figure 11:
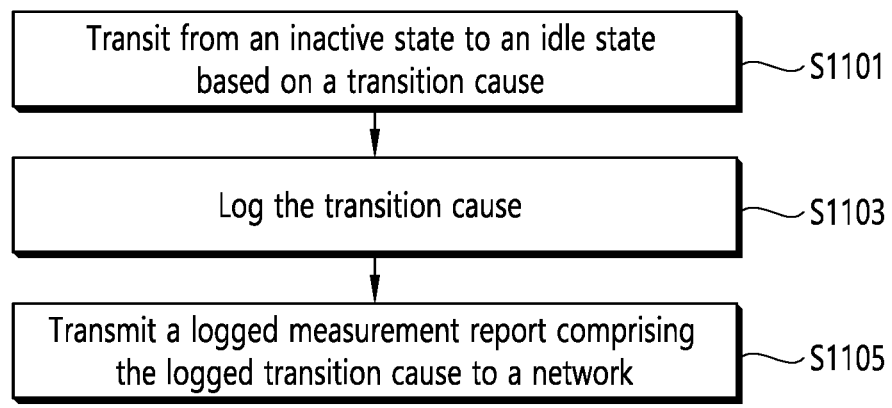
FIG. 11, shows an example of a method for measurement reporting according to an embodiment of the present disclosure.

FIG. 11, shows an example of a method for measurement reporting according to an embodiment of the present disclosure. Steps illustrated in FIG. 11 may be performed by a wireless device and/or a UE.

Referring to FIG. 11, in step S1101, the wireless device may transit from an inactive state to an idle state based on a transition cause. The wireless device may perform a state transition from the inactive state to the idle state based on the transition cause. Throughout the disclosure, the terms "transition cause" and "logging condition" may be used interchangeably.

In step S1103, the wireless device may log the transition cause. The transition cause may comprise at least one of one or more transition events that trigger the state transition; or one or more reasons why the state transmission is performed.

In step S1105, the wireless device may transmit a logged measurement report comprising the logged transition cause to a network. For example, the wireless device may transmit the logged measurement report comprising the transition cause to the network upon receiving a measurement report request, which will be explained later.

According to various embodiments, the wireless device may receive, from the network, a measurement configuration for measurement logging comprising a logging interval. The wireless device may perform a measurement to obtain one or more measurement values in the idle mode on a basis of the logging interval. The wireless device may log the one or more measurement values. The logged measurement report may further comprise the one or more logged measurement values. The one or more measurement values may comprise at least one of a cell identifier (ID) of a serving cell, a cell quality of the serving cell, a cell ID of at least one neighbor cell, a cell quality of the at least one neighbor cell, a measurement time, or a measurement location. The measurement time may be a time at which the measurement is performed. The measurement location may be a location in which the measurement is performed.

According to various embodiments, the wireless device may transmit, to the network, an availability of the logged measurement report. The wireless device may receive, from the network, a measurement report request for requesting to transmit the logged measurement report, as a response for the availability information. The network may determine to transmit the measurement report request based on the availability information. The wireless device may transmit the logged measurement report upon receiving the measurement report request.

According to various embodiments, the one or more reasons may inform that the state transition is triggered by the one or more transition events.

According to various embodiments, the one or more transition events comprise at least one of: a first transition event that an acceptable cell is found after the UE enters an any cell selection state; a second transition event that the wireless device is in camped on any cell state after the UE enters the any cell selection state; a third transition event that the wireless device is requested to perform a radio access network (RAN) area update (or, RNA update) triggered by a non-access stratum (NAS) entity of the wireless device after the wireless device enters the any cell selection state; a fourth transition event that the wireless device is required to perform a RAN area update triggered by an expiry of a first validity timer (e.g., T380 timer) after the UE enters the any cell selection state; or a fifth transition event that a radio access control (RRC) resume procedure is failed by an expiry of a second validity timer (e.g., T319 timer).

According to various embodiments, the first validity timer may start upon a reception of a RRC release message comprising the first validity timer by the wireless device. The second validity timer may start upon a transmission of a RRC resume request message by the wireless device.

According to various embodiments, the any cell selection state may be a state in which the wireless device performs a cell selection process to search a suitable cell. The camped on any cell state may be a state in which the wireless device has completed the cell selection process and selected a cell.

According to various embodiments, the wireless device may perform a logging of a measurement in the inactive state based on that one or more triggering events for the logging occurs. The one or more triggering events may comprise at least one of: a first triggering event that the wireless device transits from an any cell selection state to a camped on any cell state; a second triggering event that a first validity timer (e.g., T380 timer) expires while the wireless device is in the any cell selection state; a third triggering event that a radio access network (RAN) area update is trigged by an upper layer (e.g., NAS entity of wireless device) while the wireless device is in the any cell selection state; or a fourth triggering event that a second validity timer (e.g., T319 timer) expires.

According to various embodiments, the wireless device may log the one or more triggering events for the logging in a memory of the wireless device.

According to various embodiments, the logged measurement report may further comprise the one or more triggering events for the logging.

Figure 12:
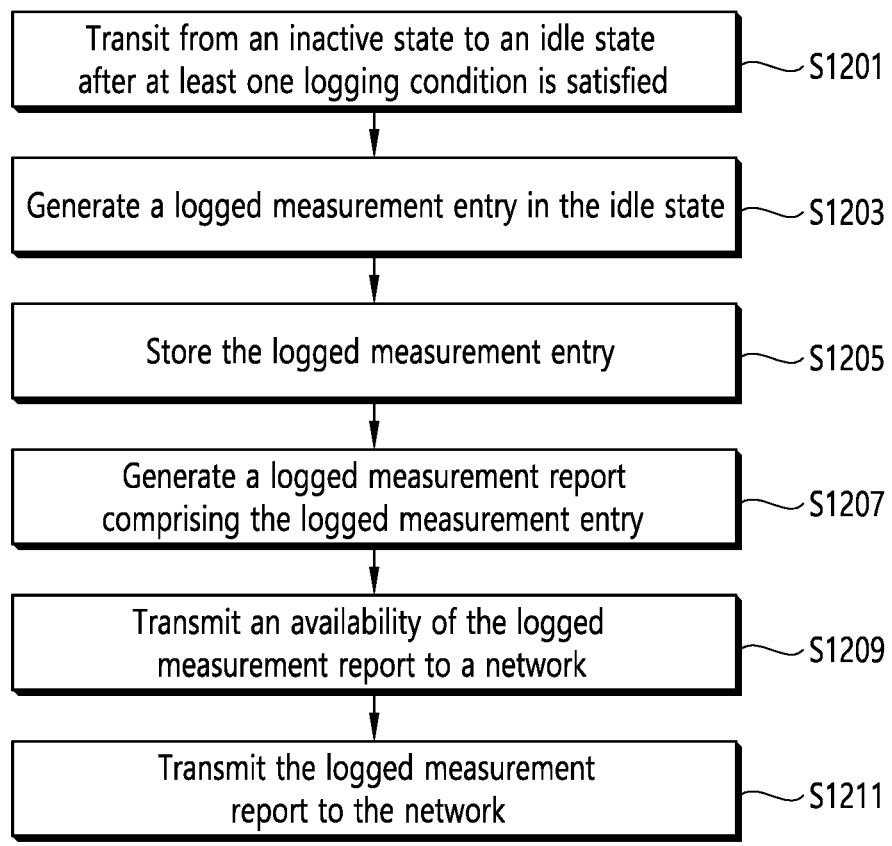
FIG. 12 shows an example of a method for measurements logging according to an embodiment of the present disclosure.

FIG. 12 shows an example of a method for measurements logging according to an embodiment of the present disclosure. Steps illustrated in FIG. 12 may be performed by a wireless device and/or a UE.

Referring to FIG. 12, in step S1201, the UE may transit from an inactive state to an idle state after at least one logging condition is satisfied. The UE may detect a logging condition. When at least one of the following logging conditions is met while the UE is in RRC_INACTIVE, it may be considered that the UE detects the logging condition:

Acceptable cell is/has been found after the UE entered any cell selection state;

The UE is/has been in camped on any cell state after the UE entered any cell selection state;

The UE is/was requested to perform RAN area update which is triggered by UE NAS layer, after the UE entered any cell selection state;

The UE is/was required to perform RAN area update which is triggered by an expiration of a validity timer (e.g. T380), after the UE entered any cell selection state; or RRC resume is/was failed by an expiry of a validity timer (e.g. T319).

The UE may transit to any cell selection state if at least one of the following conditions is satisfied:

a) No suitable or acceptable cell can be found;

b) The UE is not able to detect any cells for which S criteria (or, cell selection criteria) is fulfilled; or c) The UE is entering/enters in out-of-service.

After at least one of the logging conditions is met while the UE is in RRC_INACTIVE, the UE in RRC_INACTIVE may transit to RRC_IDLE.

In step S1203, the UE may generate/construct a logged measurement entity in the idle state. The logged measurement entry may include available measurement results and/or at least one of the following information:

1. Cause information indicating why the UE transits from RRC_INACTIVE to RRC_IDLE.

For example, the cause information may indicate that the state transition is triggered by the event that acceptable cell is/has been found after the UE entered any cell selection state.

For example, the cause information may indicate that the state transition is triggered by the event that the UE is/has been in camped on any cell state after the UE entered any cell selection state.

For example, the cause information may indicate that the state transition is triggered by the event that the UE is/was requested to perform RAN area update (or, RNA update) which is triggered by UE NAS layer after the UE entered any cell selection state.

For example, the cause information may indicate that the state transition is triggered by the event that the UE is/was required to perform RAN area update which is triggered by an expiry of a validity timer (e.g. T380) after the UE entered any cell selection state.

For example, the cause information may indicate that the state transition is triggered by the event that RRC_resume is/was failed by an expiry of a validity timer (T319).

2. Cause information indicating the event that triggers the logging in RRC_INACTIVE and/or the event that triggers a state transition from the RRC_INACTIVE to the RRC_IDLE.

For example, the event can be "acceptable cell is/has been found after the UE entered any cell selection state".

For example, the event can be "the UE is/has been in camped on any cell state after the UE entered any cell selection state".

For example, the event can be "the UE is/was requested to perform RAN area update which is triggered by UE NAS layer after the UE entered any cell selection state".

For example, the event can be "the UE is/was required to perform RAN area update which is triggered by an expiry of a validity timer (e.g. T380) after the UE entered any cell selection state".

For example, the event can be "RRC resume is/was failed by an expiry of a validity timer (e.g. T319).

3. Serving cell's measurement result (i.e. cell quality of the serving cell, signal quality/strength of the serving cell, channel state/quality of the serving cell, and/or RSRP/RSRQ of the serving cell);

4. Neighboring cell's measurement result (i.e. cell quality of the neighbor cell, signal quality/strength of the neighbor cell, channel state/quality of the neighbor cell, and/or RSRP/RSRQ of the neighbor cell); or 5. Location information and time information. For example, the location information may comprise a measurement location, and the time information may comprise a measurement time.

In step S1205, the UE may store the logged measurement entry.

In step S1207, the UE may generate/construct a logged measurement report message including the stored logged measurement entries. For example, the logged measurement report message may be a kind of an RRC message.

In step S1209, the UE may transmit an availability of the logged measurement report to a network. The UE may indicate to the network that the logged measurement report message is available. For example, the UE may transmit an RRCSetupComplete message comprising the availability of the logged measurement report to the network.

In step S1211, the UE may transmit the logged measurement report message to the network. For example, the UE may transmit the logged measurement report to the network upon receiving a measurement report request from the network.

The measurements logging may specify the logging of available measurements by a UE in RRC_IDLE or RRC_INACTIVE that has a logged measurement configuration and the logging of available measurements by a UE in both RRC_IDLE and RRC_CONNECTED if targetMBSFN-AreaList is included in VarLogMeasConfig.

According to various embodiments, while the timer T330 is running, the UE shall:
1> if measurement logging is suspended:
2> if during the last logging interval the IDC problems detected by the UE is resolved, resume measurement logging;
1> if not suspended, perform the logging in accordance with the following:
2> if targetMBSFN-AreaList is included in VarLogMeasConfig:
3> if the UE is camping normally on an E-UTRA cell or is connected to E-UTRA; and
3> if the RPLMN is included in plmn-IdentityList stored in VarLogMeasReport; and
3> if the PCell (in RRC_CONNECTED) or cell where the UE is camping (in RRC_IDLE) is part of the area indicated by areaConfiguration if configured in VarLogMeasConfig:
4> for MBSFN areas, indicated in targetMBSFN-AreaList, from which the UE is receiving MBMS service:
5> perform MBSFN measurements in accordance with the performance requirements as specified in TS 36.133.

When the UE is configured to perform MBSFN measurement logging by targetMBSFN-AreaList, the UE may not be required to receive additional MBSFN subframes (i.e. logging may be based on the subframes corresponding to the MBMS services the UE is receiving).

5> perform logging at regular time intervals as defined by the loggingInterval in VarLogMeasConfig, but only for those intervals for which MBSFN measurement results are available as specified in TS 36.133.
2> else if:
3> if the UE is in any cell selection state (as specified in TS 36.304):
4> perform the logging at regular time intervals, as defined by the loggingInterval in VarLogMeasConfig;
3> else if the UE is camping normally on an NR cell and if the RPLMN is included in plmn-IdentityList stored in VarLogMeasReport and, if the cell is part of the area indicated by areaConfiguration if configured in VarLogMeasConfig:
4> perform the logging at regular time intervals, as defined by the loggingInterval in VarLogMeasConfig;
3> if in RRC_INACTIVE:
4> if the UE transits from any cell selection state to camped on any cell state; or
4> if T380 expires while the UE is in any cell selection state; or
4> if RNA Update is triggered by upper layer while the UE is in any cell selection state; or
4> if T319 expires:
5> perform the logging at current time for RR_INACTIVE;
2> when adding a logged measurement entry in VarLogMeasReport, include the fields in accordance with the following:
3> if the UE detected IDC problems during the last logging interval:
4> if measResultServCell in VarLogMeasReport is not empty:
5> include InDeviceCoexDetected;
5> suspend measurement logging from the next logging interval;
4> else:
5> suspend measurement logging;
The UE may detect the start of IDC problems as early as phase 1 as described in clause 23.4 of TS 36.300.
3> set the relativeTimeStamp to indicate the elapsed time since the moment at which the logged measurement configuration was received;
3> if detailed location information became available during the last logging interval, set the content of the locationInfo as follows:
4> include the locationCoordinates;
3> if wlan-NameList is included in VarLogMeasConfig:
4> if detailed WLAN measurements are available:
5> include logMeasResultListWLAN, in order of decreasing RSSI for WLAN APs;
3> if bt-NameList is included in VarLogMeasConfig:
4> if detailed Bluetooth measurements are available:
5> include logMeasResultListBT, in order of decreasing RSSI for Bluetooth beacons;
3> if targetMBSFN-AreaList is included in VarLogMeasConfig:

4> for each MBSFN area, for which the mandatory measurements result fields became available during the last logging interval:
5> set the rsrpResultMBSFN, rsrqResultMBSFN to include measurement results that became available during the last logging interval;
5> include the fields signallingBLER-Result or dataBLER-MCH-ResultList if the concerned BLER results are available,
5> set the mbsfn-AreaId and carrierFrequency to indicate the MBSFN area in which the UE is receiving MBSFN transmission;
4> if in RRC_CONNECTED:
5> set the servCellIdentity to indicate global cell identity of the PCell;
5> set the measResultServCell to include the layer 3 filtered measured results of the PCell;
5> if available, set the measResultNeighCells to include the layer 3 filtered measured results of SCell(s) and neighbouring cell(s) measurements that became available during the last logging interval, in order of decreasing RSRP, for at most the following number of cells: 6 intra-frequency and 3 inter-frequency cells per frequency and according to the following:
6> for each cell included, include the optional fields that are available;
5> if available, optionally set the measResultNeighCells to include the layer 3 filtered measured results of neighbouring cell(s) measurements that became available during the last logging interval, in order of decreasing RSCP(UTRA)/RSSI(GERAN)/Pilot-Strength(cdma2000), for at most the following number of cells: 3 inter-RAT cells per frequency (UTRA, cdma2000)/set of frequencies (GERAN), and according to the following:
6> for each cell included, include the optional fields that are available;
4> if in RRC_IDLE:
5> set the servCellIdentity to indicate global cell identity of the serving cell;
5> set the measResultServCell to include the quantities of the serving cell;
5> if available, set the measResultNeighCells, in order of decreasing ranking-criterion as used for cell re-selection, to include neighbouring cell measurements that became available during the last logging interval for at most the following number of neighbouring cells: 6 intra-frequency and 3 inter-frequency neighbours per frequency and according to the following:
6> for each neighbour cell included, include the optional fields that are available;
5> if available, optionally set the measResultNeighCells, in order of decreasing ranking-criterion as used for cell re-selection, to include neighbouring cell measurements that became available during the last logging interval, for at most the following number of cells: 3 inter-RAT cells per frequency (UTRA, cdma2000)/set of frequencies (GERAN), and according to the following:
6> for each cell included, include the optional fields that are available;
4> for the cells included according to the previous (i.e. covering previous and current serving cells as well as neighbouring EUTRA cells) include results according to the extended RSRQ if corresponding results are available according to the associated performance requirements defined in TS 36.133;
4> for the cells included according to the previous (i.e. covering previous and current serving cells as well as neighbouring EUTRA cells) include RSRQ type if the result was based on measurements using a wider band or using all OFDM symbols;

The UE may include the latest results in accordance with the performance requirements as specified in TS 36.133. For example, RSRP and RSRQ results may be available only if the UE has a sufficient number of results, or the UE receives a sufficient number of subframes during the logging interval.
3> else:
4> if the UE is in any cell selection state (as specified in TS 36.304):
5> set anyCellSelectionDetected to indicate the detection of no suitable or no acceptable cell found;
5> set the servCellIdentity to indicate global cell identity of the last logged cell that the UE was camping on;
5> set the measResultServCell to include the quantities of the last logged cell the UE was camping on;
5> if the logging is for RRC_INACTIVE:
6> if the UE transits from any cell selection state to camped on any cell state; or
6> if T380 expires; or
6> if RNA Update is triggered by upper layer; or
6> if T319 expires:
7> set transitionCause to indicate the event that triggers this logging;
4> else:
5> if the UE moved from RRC_INACTIVE to RRC_IDLE and there is no logged measurement entry in VarLogMeasReport for the transition cause:
6> set transitionCause to indicate the transition cause why the UE moved to RRC_IDLE;
5> set the servCellIdentity to indicate global cell identity of the cell the UE is camping on;
5> set the measResultServCell to include the quantities of the cell the UE is camping on;
4> if available, set the measResultNeighCells, in order of decreasing ranking-criterion as used for cell re-selection, to include neighbouring cell measurements that became available during the last logging interval for at most the following number of neighbouring cells: 6 intra-frequency and 3 inter-frequency neighbours per frequency as well as 3 inter-RAT neighbours, per frequency/set of frequencies (GERAN) per RAT and according to the following:
5> for each neighbour cell included, include the optional fields that are available;
4> for the cells included according to the previous (i.e. covering previous and current serving cells as well as neighbouring cells) include results according to the extended RSRQ if corresponding results are available according to the associated performance requirements defined in TS 36.133;
4> for the cells included according to the previous (i.e. covering previous and current serving cells as well as neighbouring cells) include RSRQ type if the result was based on measurements using a wider band or using all OFDM symbols;

The UE may include the latest results of the available measurements as used for cell reselection evaluation in RRC_IDLE, RRC_INACTIVE or as used for evaluation of reporting criteria or for measurement reporting in RRC_CONNECTED, which may be performed in accordance with the performance requirements as specified in TS 36.133.

2> when the memory reserved for the logged measurement information becomes full, stop timer T330 and perform the same actions as performed upon expiry of T330.

Figure 13:
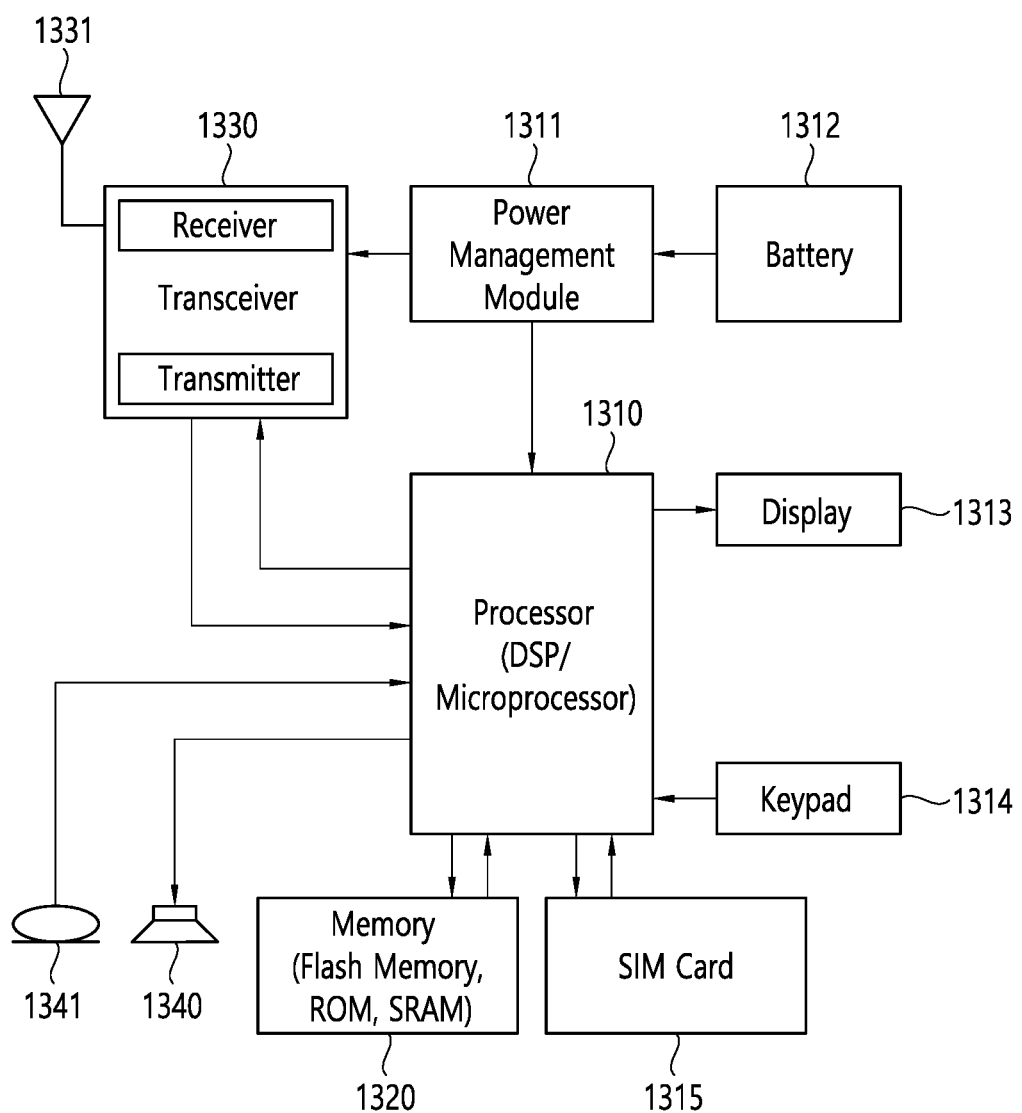
FIG. 13 shows a UE to implement an embodiment of the present disclosure.

FIG. 13 shows a UE to implement an embodiment of the present disclosure. The present disclosure described above for UE side may be applied to this embodiment.

A UE includes a processor 1313, a power management module 1311, a battery 1312, a display 1313, a keypad 1314, a subscriber identification module (SIM) card 1315, a memory 1320, a transceiver 1330, one or more antennas 1331, a speaker 1340, and a microphone 1341.

The processor 1313 may be configured to implement proposed functions, procedures and/or methods described in this description. Layers of the radio interface protocol may be implemented in the processor 1313. The processor 1313 may include application-specific integrated circuit (ASIC), other chipset, logic circuit and/or data processing device. The processor 1313 may be an application processor (AP). The processor 1313 may include at least one of a digital signal processor (DSP), a central processing unit (CPU), a graphics processing unit (GPU), a modem (modulator and demodulator). An example of the processor 1313 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1313 may be configured to, or configured to control the transceiver 1330 to implement steps performed by the UE and/or the wireless device throughout the disclosure.

The power management module 1311 manages power for the processor 1313 and/or the transceiver 1330. The battery 1312 supplies power to the power management module 1311. The display 1313 outputs results processed by the processor 1313. The keypad 1314 receives inputs to be used by the processor 1313. The keypad 1314 may be shown on the display 1313. The SIM card 1315 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1320 is operatively coupled with the processor 1313 and stores a variety of information to operate the processor 1313. The memory 1320 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1320 and executed by the processor 1313. The memory 1320 can be implemented within the processor 1313 or external to the processor 1313 in which case those can be communicatively coupled to the processor 1313 via various means as is known in the art.

The transceiver 1330 is operatively coupled with the processor 1313, and transmits and/or receives a radio signal. The transceiver 1330 includes a transmitter and a receiver. The transceiver 1330 may include baseband circuitry to process radio frequency signals. The transceiver 1330 controls the one or more antennas 1331 to transmit and/or receive a radio signal.

The speaker 1340 outputs sound-related results processed by the processor 1313. The microphone 1341 receives sound-related inputs to be used by the processor 1313.

Figure 14:
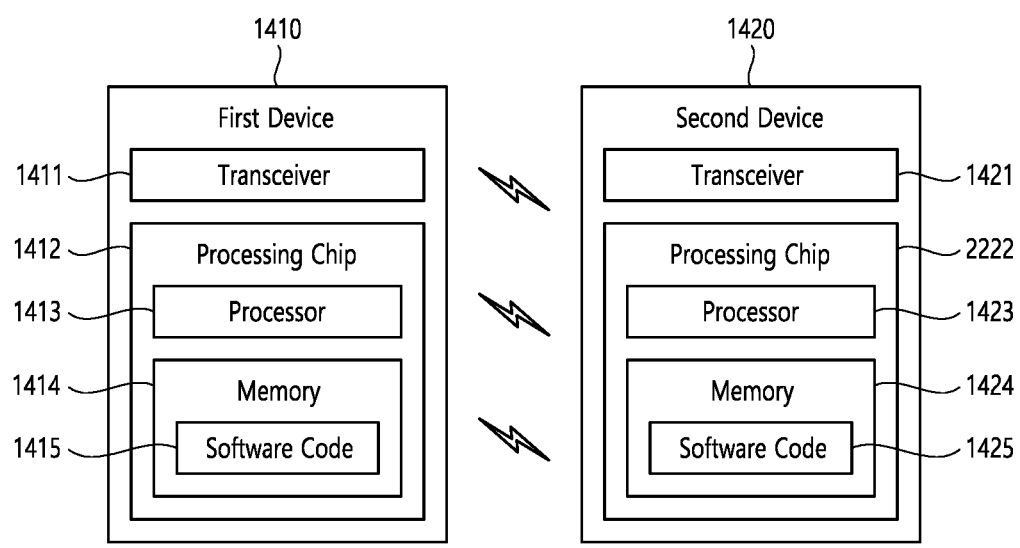
FIG. 14 shows another example of a wireless communication system to which the technical features of the present disclosure can be applied.

FIG. 14 shows another example of a wireless communication system to which the technical features of the present disclosure can be applied.

Referring to FIG. 14, the wireless communication system may include a first device 1410 (i.e., first device 210) and a second device 1420 (i.e., second device 220).

The first device 1410 may include at least one transceiver, such as a transceiver 1411, and at least one processing chip, such as a processing chip 1412. The processing chip 1412 may include at least one processor, such a processor 1413, and at least one memory, such as a memory 1414. The memory may be operably connectable to the processor 1413. The memory 1414 may store various types of information and/or instructions. The memory 1414 may store a software code 1415 which implements instructions that, when executed by the processor 1413, perform operations of the first device 910 described throughout the disclosure. For example, the software code 1415 may implement instructions that, when executed by the processor 1413, perform the functions, procedures, and/or methods of the first device 1410 described throughout the disclosure. For example, the software code 1415 may control the processor 1413 to perform one or more protocols. For example, the software code 1415 may control the processor 1413 to perform one or more layers of the radio interface protocol.

The second device 1420 may include at least one transceiver, such as a transceiver 1421, and at least one processing chip, such as a processing chip 1422. The processing chip 1422 may include at least one processor, such a processor 1423, and at least one memory, such as a memory 1424. The memory may be operably connectable to the processor 1423. The memory 1424 may store various types of information and/or instructions. The memory 1424 may store a software code 1425 which implements instructions that, when executed by the processor 1423, perform operations of the second device 1420 described throughout the disclosure. For example, the software code 1425 may implement instructions that, when executed by the processor 1423, perform the functions, procedures, and/or methods of the second device 1420 described throughout the disclosure. For example, the software code 1425 may control the processor 1423 to perform one or more protocols. For example, the software code 1425 may control the processor 1423 to perform one or more layers of the radio interface protocol.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 15:
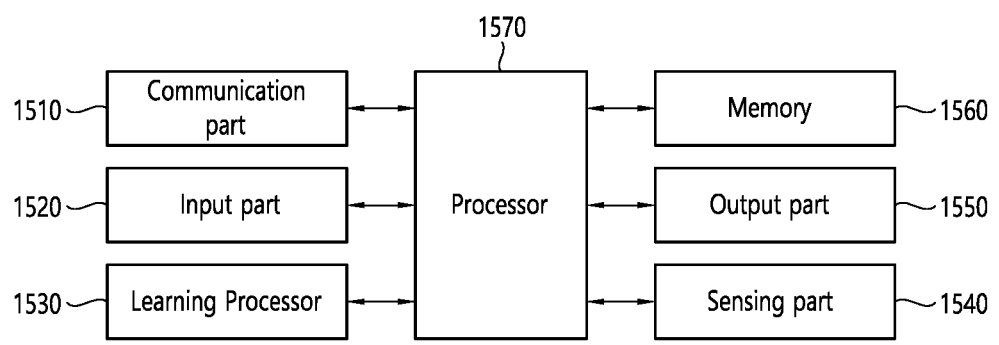
FIG. 15 shows an example of an AI device to which the technical features of the present disclosure can be applied.

FIG. 15 shows an example of an AI device to which the technical features of the present disclosure can be applied.

The AI device 1500 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 15, the AI device 1500 may include a communication part 1510, an input part 1520, a learning processor 1530, a sensing part 1540, an output part 1550, a memory 1560, and a processor 1570.

The communication part 1510 can transmit and/or receive data to and/or from external devices such as the AI devices and the AI server using wire and/or wireless communication technology. For example, the communication part 1510 can transmit and/or receive sensor information, a user input, a learning model, and a control signal with external devices. The communication technology used by the communication part 1510 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1520 can acquire various kinds of data. The input part 1520 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1520 can acquire input data to be used when acquiring an output using learning data and a learning model for model learning. The input part 1520 may obtain raw input data, in which case the processor 1570 or the learning processor 1530 may extract input features by preprocessing the input data.

The learning processor 1530 may learn a model composed of an ANN using learning data. The learned ANN can be referred to as a learning model. The learning model can be used to infer result values for new input data rather than learning data, and the inferred values can be used as a basis for determining which actions to perform. The learning processor 1530 may perform AI processing together with the learning processor of the AI server. The learning processor 1530 may include a memory integrated and/or implemented in the AI device 1500. Alternatively, the learning processor 1530 may be implemented using the memory 1560, an external memory directly coupled to the AI device 1500, and/or a memory maintained in an external device.

The sensing part 1540 may acquire at least one of internal information of the AI device 1500, environment information of the AI device 1500, and/or the user information using various sensors. The sensors included in the sensing part 1540 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1550 may generate an output related to visual, auditory, tactile, etc. The output part 1550 may include a display unit for outputting visual information, a speaker for outputting auditory information, and/or a haptic module for outputting tactile information.

The memory 1560 may store data that supports various functions of the AI device 1500. For example, the memory 1560 may store input data acquired by the input part 1520, learning data, a learning model, a learning history, etc.

The processor 1570 may determine at least one executable operation of the AI device 1500 based on information determined and/or generated using a data analysis algorithm and/or a machine learning algorithm. The processor 1570 may then control the components of the AI device 1500 to perform the determined operation. The processor 1570 may request, retrieve, receive, and/or utilize data in the learning processor 1530 and/or the memory 1560, and may control the components of the AI device 1500 to execute the predicted operation and/or the operation determined to be desirable among the at least one executable operation. The processor 1570 may generate a control signal for controlling the external device, and may transmit the generated control signal to the external device, when the external device needs to be linked to perform the determined operation. The processor 1570 may obtain the intention information for the user input and determine the user's requirements based on the obtained intention information. The processor 1570 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1530 and/or learned by the learning processor of the AI server, and/or learned by their distributed processing. The processor 1570 may collect history information including the operation contents of the AI device 1500 and/or the user's feedback on the operation, etc. The processor 1570 may store the collected history information in the memory 1560 and/or the learning processor 1530, and/or transmit to an external device such as the AI server. The collected history information can be used to update the learning model. The processor 1570 may control at least some of the components of AI device 1500 to drive an application program stored in memory 1560. Furthermore, the processor 1570 may operate two or more of the components included in the AI device 1500 in combination with each other for driving the application program.

Figure 16:
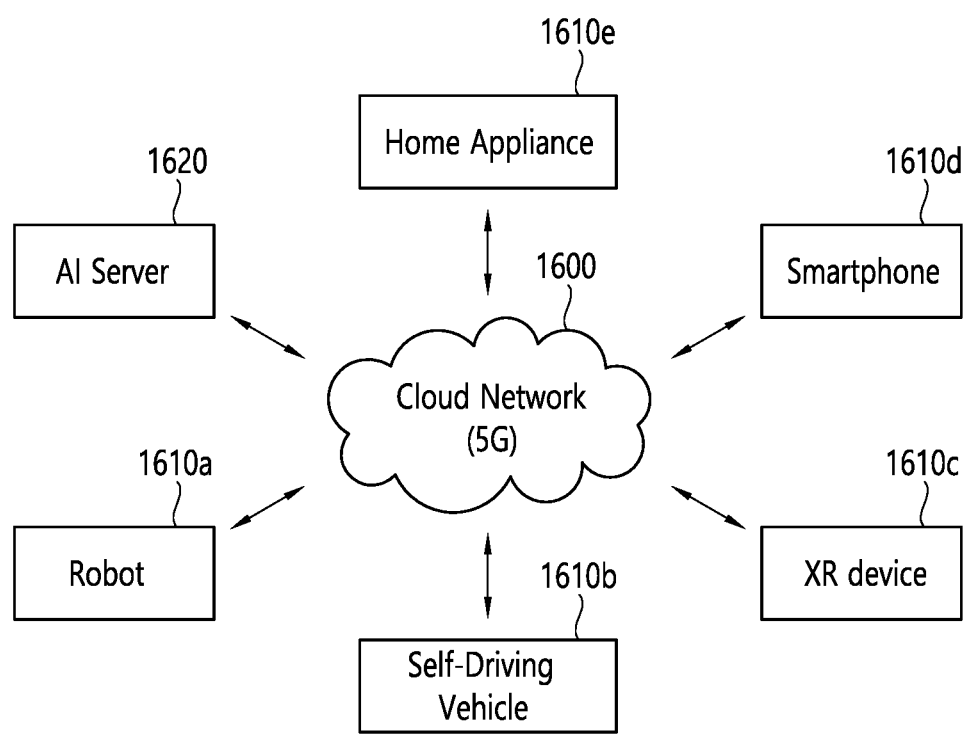
FIG. 16 shows an example of an AI system to which the technical features of the present disclosure can be applied.

FIG. 16 shows an example of an AI system to which the technical features of the present disclosure can be applied.

Referring to FIG. 16, in the AI system, at least one of an AI server 1620, a robot 1610*a*, an autonomous vehicle 1610*b*, an XR device 1610*c*, a smartphone 1610*d* and/or a home appliance 1610*e* is connected to a cloud network 1600. The robot 1610*a*, the autonomous vehicle 1610*b*, the XR device 1610*c*, the smartphone 1610*d*, and/or the home appliance 1610*e* to which the AI technology is applied may be referred to as AI devices 1610*a* to 1610*e*.

The cloud network 1600 may refer to a network that forms part of a cloud computing infrastructure and/or resides in a cloud computing infrastructure. The cloud network 1600 may be configured using a 3G network, a 4G or LTE network, and/or a 5G network. That is, each of the devices 1610*a* to 1610*e* and 1620 consisting the AI system may be connected to each other through the cloud network 1600. In particular, each of the devices 1610*a* to 1610*e* and 1620 may communicate with each other through a base station, but may directly communicate with each other without using a base station.

The AI server 1620 may include a server for performing AI processing and a server for performing operations on big data. The AI server 1620 is connected to at least one or more of AI devices constituting the AI system, i.e. the robot 1610*a*, the autonomous vehicle 1610*b*, the XR device 1610*c*, the smartphone 1610*d* and/or the home appliance 1610*e* through the cloud network 1600, and may assist at least some AI processing of the connected AI devices 1610*a* to 1610*e*. The AI server 1620 can learn the ANN according to the machine learning algorithm on behalf of the AI devices 1610*a* to 1610*e*, and can directly store the learning models and/or transmit them to the AI devices 1610*a* to 1610*e*. The AI server 1620 may receive the input data from the AI devices 1610*a* to 1610*e*, infer the result value with respect to the received input data using the learning model, generate a response and/or a control command based on the inferred result value, and transmit the generated data to the AI devices 1610*a* to 1610*e*. Alternatively, the AI devices 1610*a* to 1610*e* may directly infer a result value for the input data using a learning model, and generate a response and/or a control command based on the inferred result value.

Various embodiments of the AI devices 1610*a* to 1610*e* to which the technical features of the present disclosure can be applied will be described. The AI devices 1610*a* to 1610*e* shown in FIG. 16 can be seen as specific embodiments of the AI device 1500 shown in FIG. 15.

The present disclosure can have various advantageous effects.

For example, a wireless device may log a transition cause of a transmission from an inactive state to an idle state and transmit a logged measurement report including the logged transition cause to a network so that the network may know why the wireless device transits from the inactive state to the idles state and why the wireless device performs RRC_IDLE procedures, and therefore, the network can optimize the network performance based on the logged measurement report.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a user equipment (UE) in a wireless communication system, the method comprising:
  receiving, from a network, a logged measurement configuration;
  entering a radio resource control (RRC) inactive state (RRC_INACTIVE);
  performing a state transition from the RRC_INACTIVE to an RRC idle state (RRC_IDLE) based on a transition cause;
  generating one or more logged measurement entries based on the logged measurement configuration, wherein the one or more logged measurement entries comprise the transition cause;
  generating a logged measurement report comprising the one or more logged measurement entries;
  transmitting, to the network, information informing that the logged measurement report is available for transmission at the UE;
  receiving, from the network, a request for the logged measurement report; and
  transmitting, to the network, the logged measurement report comprising the one or more logged measurement entries,
  wherein the transition cause comprises one or more transition events that trigger the state transition or information informing that the state transition is triggered by the one or more transition events, and wherein the one or more transition events comprise at least one of:
a first transition event that an acceptable cell is found after the UE enters an any cell selection state;
a second transition event that the UE is in camped on any cell state after the UE enters the any cell selection state;
a third transition event that the UE is requested to perform a radio access network (RAN) area update triggered by a non-access stratum (NAS) entity of the UE after the UE enters the any cell selection state; or
a fourth transition event that the UE is required to perform a RAN area update triggered by an expiry of a validity timer after the UE enters the any cell selection state.

2. The method of claim 1, wherein the one or more logged measurement entries further comprise at least one of a cell identifier (ID) of a serving cell, a cell quality of the serving cell, a cell ID of at least one neighbor cell, a cell quality of the at least one neighbor cell, a measurement time, or a measurement location.

3. The method of claim 1, wherein the validity timer is a first validity timer, and
wherein the one or more transition events further comprise
a fifth transition event that a radio access control (RRC) resume procedure is failed by an expiry of a second validity timer.

4. The method of claim 3, wherein the first validity timer starts upon a reception of a RRC release message comprising the first validity timer by the wireless UE, and
wherein the second validity timer starts upon a transmission of a RRC resume request message by the UE.

5. The method of claim 1, wherein the any cell selection state is a state in which the UE performs a cell selection process to search a suitable cell, and
wherein the camped on any cell state is a state in which the UE has completed the cell selection process and selected a cell.

6. The method of claim 1, wherein the UE is in communication with at least one of a mobile station, a network, or autonomous vehicles other than the UE.

7. A user equipment (UE) in a wireless communication system comprising:
a transceiver;
a memory; and
at least one processor operatively coupled to the transceiver and the memory, wherein the memory stores instructions that, based on being executed by the at least one processor, perform operations comprising:
receiving, from a network, a logged measurement configuration;
entering a radio resource control (RRC) inactive state (RRC_INACTIVE);
performing a state transition from the RRC_INACTIVE to an RRC idle state (RRC_IDLE) based on a transition cause;
generating one or more logged measurement entries based on the logged measurement configuration, wherein the one or more logged measurement entries comprise the transition cause;
generating a logged measurement report comprising the one or more logged measurement entries;
transmitting, to the network, information informing that the logged measurement report is available for transmission at the UE;
receiving, from the network, a request for the logged measurement report; and
transmitting, to the network, the logged measurement report comprising the one or more logged measurement entries,
wherein the transition cause comprises one or more transition events that trigger the state transition or information informing that the state transition is triggered by the one or more transition events, and
wherein the one or more transition events comprise at least one of:
a first transition event that an acceptable cell is found after the UE enters an any cell selection state;
a second transition event that the UE is in camped on any cell state after the UE enters the any cell selection state;
a third transition event that the UE is requested to perform a radio access network (RAN) area update triggered by a non-access stratum (NAS) entity of the UE after the UE enters the any cell selection state; or
a fourth transition event that the UE is required to perform a RAN area update triggered by an expiry of a validity timer after the UE enters the any cell selection state.

8. A processor for a user equipment (UE) in a wireless communication system, wherein the processor is configured to control the UE to perform operations comprising:
receiving, from a network, a logged measurement configuration;
entering a radio resource control (RRC) inactive state (RRC_INACTIVE);
performing a state transition from the RRC_INACTIVE to an RRC idle state (RRC_IDLE) based on a transition cause;
generating one or more logged measurement entries based on the logged measurement configuration, wherein the one or more logged measurement entries comprise the transition cause;
generating a logged measurement report comprising the one or more logged measurement entries;
transmitting, to the network, information informing that the logged measurement report is available for transmission at the UE;
receiving, from the network, a request for the logged measurement report; and
transmitting, to the network, the logged measurement report comprising the one or more logged measurement entries,
wherein the transition cause comprises one or more transition events that trigger the state transition or information informing that the state transition is triggered by the one or more transition events, and
wherein the one or more transition events comprise at least one of:
a first transition event that an acceptable cell is found after the UE enters an any cell selection state;
a second transition event that the UE is in camped on any cell state after the UE enters the any cell selection state;
a third transition event that the UE is requested to perform a radio access network (RAN) area update triggered by a non-access stratum (NAS) entity of the UE after the UE enters the any cell selection state; or
a fourth transition event that the UE is required to perform a RAN area update triggered by an expiry of a validity timer after the UE enters the any cell selection state.

9. A non-transitory computer-readable medium having recorded thereon a program for performing each step of a method performed by a user equipment (UE) on a computer, the method comprising:
receiving, from a network, a logged measurement configuration;

entering a radio resource control (RRC) inactive state (RRC_INACTIVE);
performing a state transition from the RRC_INACTIVE to an RRC idle state (RRC_IDLE) based on a transition cause;
generating one or more logged measurement entries based on the logged measurement configuration, wherein the one or more logged measurement entries comprise the transition cause;
generating a logged measurement report comprising the one or more logged measurement entries;
transmitting, to the network, information informing that the logged measurement report is available for transmission at the UE;
receiving, from the network, a request for the logged measurement report; and
transmitting, to the network, the logged measurement report comprising the one or more logged measurement entries, wherein the transition cause comprises one or more transition events that trigger the state transition or information informing that the state transition is triggered by the one or more transition events, and
wherein the one or more transition events comprise at least one of:
a first transition event that an acceptable cell is found after the UE enters an any cell selection state;
a second transition event that the UE is in camped on any cell state after the UE enters the any cell selection state;
a third transition event that the UE is requested to perform a radio access network (RAN) area update triggered by a non-access stratum (NAS) entity of the UE after the UE enters the any cell selection state; or
a fourth transition event that the UE is required to perform a RAN area update triggered by an expiry of a validity timer after the UE enters the any cell selection state.

* * * * *